March 19, 1957  C. R. ROCHE  2,785,581
CONTROL SYSTEM FOR AUTOMATIC TRANSMISSION
Filed May 14, 1949  4 Sheets-Sheet 1

INVENTOR.
Clifton R. Roche.
BY
Harness, Dickey & Pierce
ATTORNEYS.

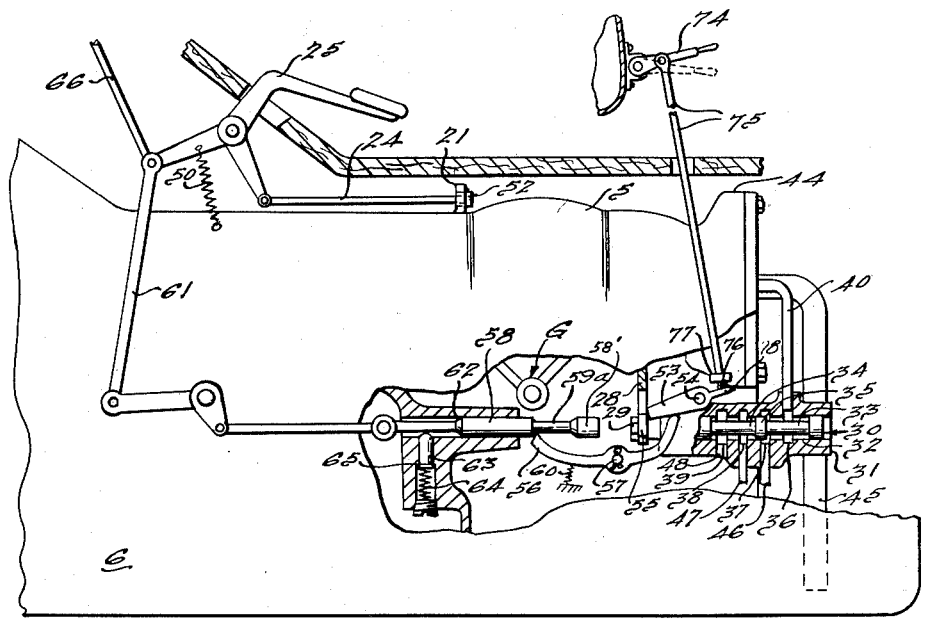

INVENTOR.
Clifton R. Roche.
BY
Harness, Dickey & Pierce
ATTORNEYS.

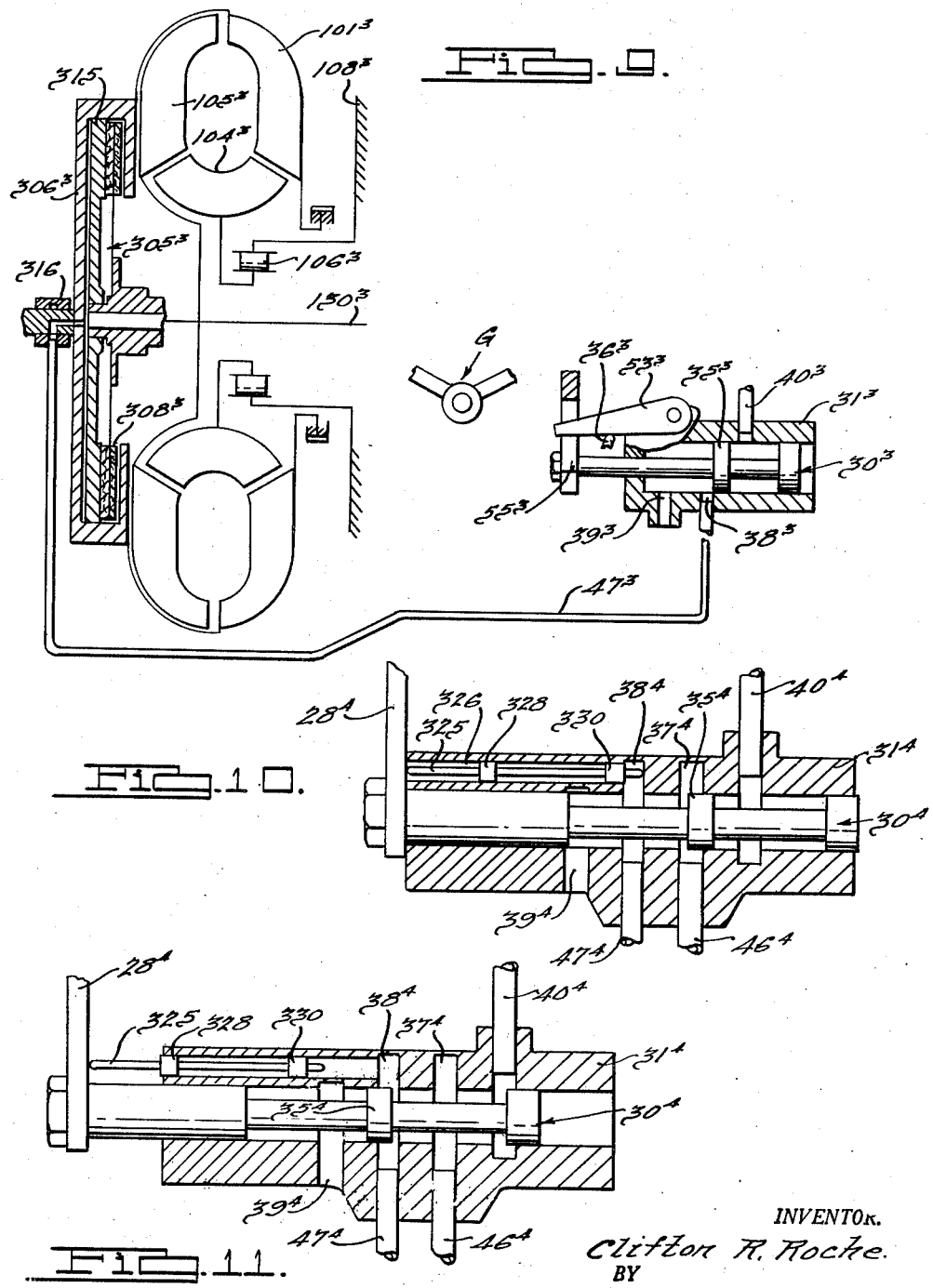

United States Patent Office 2,785,581
Patented Mar. 19, 1957

2,785,581

CONTROL SYSTEM FOR AUTOMATIC TRANSMISSION

Clifton R. Roche, Los Angeles, Calif.

Application May 14, 1949, Serial No. 93,355

40 Claims. (Cl. 74—472)

This invention relates to automatic transmissions, particularly for motor vehicles, and is concerned with improving the action and the construction of the control system for regulating the automatic shifting of speed and torque ratios of multi-ratio automatic transmissions.

It has been found most satisfactory to provide for the automatic changing of speed ratios in response to a combination of factors, including the speed of the vehicle and the torque demand upon the engine, the torque demand being considered from the standpoint of the wishes of the driver rather than the mere instantaneous load which the engine is encountering. A convenient measure of the torque demand may comprise the position of the accelerator pedal, since the extent to which it is depressed at any given time, considered in proportion to the speed of the vehicle, is a measure of the wishes of the driver with respect to torque output of the engine.

Automatic transmissions have, with the foregoing considerations in mind, been constructed with flyweight governors responsive to car speed and arranged to supply an upshifting tendency in response to increased car speed, and to supply a downshifting tendency in response to decreased car speed, the tendencies of the governor in these respects being modified, however, in proportion to the extent of accelerator depression. With such an arrangement, the control system might at light throttle cause an upshift from low to intermediate speed at 12 miles per hour, and from intermediate to high speed at 20 miles per hour, but at full throttle the shifts might occur at much higher speeds, for example, the shift from low to intermediate ratio might then occur at 35 miles per hour and from intermediate to high ratio at 55 miles per hour. It will also be understood that the foregoing indicated speed ranges are given by way of example only, but that if the vehicle were proceeding in high gear at a speed just slightly above the downshift speed, and the accelerator pedal were suddenly fully depressed, the transmission would be apt to shift all the way down to the low ratio. This would be apt to occur in the above instance when driving, for example, at about 22 miles per hour in high gear, and it would occur even if the design were such that, as is commonly the case, the downshift speed is somewhat lower than the upshift speed. Such downward shifts into the low ratio from the high ratio are not always desirable. The sudden full depression of the accelerator pedal may be due to erratic throttle operation in an emergency, or by an inexperienced driver, and the resultant lurching of the car may be dangerous. Particularly where the system incorporates a hydrokinetic torque converter, the torque output of the transmission can reach a high value when the engine is speeded up with the transmission in the intermediate ratio, due to the torque augment from the hydraulic torque converter, and this is ordinarily ample in any event.

It is an object of the present invention to provide an improved control system of the general character indicated, which is responsive to car speed and throttle opening, but which will not cause undesirable or unwanted downshifting from higher to lower speed ratios unless the driver positively desires such a downshift and calls for it by actuation of suitable supervisory mechanism.

It is a further object of this invention to provide such an improved control system which, after an upshift from a given speed ratio, will not cause a downshift of the transmission to said given speed ratio unless the accelerator pedal is depressed beyond a predetermined detent-designated position, which position may be located, for example, substantially at or near the full throttle position although, on the other hand, downshifting will occur in the normal manner through all ratios, or all desired or intended ratios, if the accelerator pedal is released and the car slows down with the accelerator pedal in the raised position.

It is a further object of this invention to provide an improved control system for an automatic transmission having more than one speed ratio and which is so constructed and arranged as to afford the operator the choice of more than one starting ratio.

Still another object of this invention is to provide an improved control system for an automatic transmission which has certain predetermined upshift characteristics and to incorporate therein novel and improved supervisory mechanism for changing the downshift characteristics independently of the upshift characteristics.

It is a further object of this invention to provide an improved hydraulic control system having a cheap and simple mechanism to cause a boost action to the control mechanism, thereby providing a more positive control system.

Still another object is to provide such an improved control system for a transmission having three or more speed ratios and which is so constructed and arranged that under the influence of the automatic shifting means the car may be operated in a fully automatic manner utilizing either the lowest speed ratio or an intermediate speed ratio as the starting gear.

Other objects and advantages of the invention will become apparent upon consideration of the present disclosure in its entirety.

In the drawings:

Fig. 4 is a fragmentary sectional elevational view of a modified construction;

Fig. 5 is a view similar to Fig. 4, showing a further modification;

Fig. 9 is a diagrammatic view of a hydrokinetic torque converter equipped with control means embodying my invention in another modified form; and Figs. 10 and 11 are longitudinal sectional elevational views of a modified control valve construction.

Figure 1:
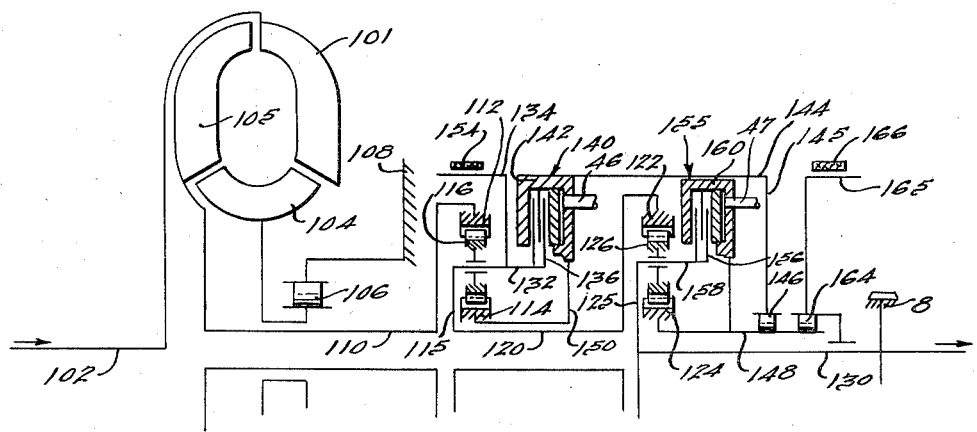
Figure 1 is a diagrammatic view showing the principal mechanical components of an automatic transmission, the action of which is adapted to be regulated by the improved control system of the present invention.

Referring now to the drawings, suitable transmission mechanisms adapted to be controlled by my improved control system are disclosed in my copending application Serial No. 748,382, filed May 16, 1947. A diagrammatic representation of the principal components of such a transmission, which will be adequate to illustrate the applicability of the principles of the present invention, is also given in Fig. 1 hereof. This arrangement will be recognized as substantially corresponding to that of the embodiment of Fig. 12 of my application Serial No. 748,382.

The transmission includes at its forward end a hydrokinetic torque converter incorporating an impeller member 101 adapted to be driven by a shaft 102 from an engine, (not shown) and which also includes a reaction element 104 and a driven runner element 105. The action of the reactor element 104 is controlled by an overrunning brake 106 which provides a one-way reaction connection with a stationary part, such as the casing portion 108, while the output of the torque converter is taken through a shaft 110 to the internal toothed ring gear 112 of a front planetary gearset, which also includes a sun gear 114 and a cage 115, carrying planetary gears 116 which mesh in the usual manner with both the sun gear 114 and ring gear 112. The output of the gearset just described is taken from the cage 115 through a shaft 120 to the internal toothed ring gear 122 of a second planetary gearset which also includes a sun gear 124 and a cage 125 carrying planetary gears 126, meshing in like fashion with sun gear 124 and ring gear 122. The output of the second planetary gearset may be taken from the cage 125 through an output shaft 130.

A rearward extension 132 of the front cage 115 carries fast thereupon a reverse reaction brake drum 134 and a set of clutch plates 136 forming part of a hydraulically actuatable disk clutch assembly, generally designated 140. The drumlike outer portion 142 of the clutch assembly 140 is extended rearwardly beyond the rear planetary gearset and rear clutch 155, as indicated at 144, and thence inwardly behind the second planetary gearset, as indicated at 145. Portion 145, which may comprise a disklike web, is connected through an overrunning clutch 146 to the tubular shaft 148 constituting a rearward extension of the hub of rear sun gear 124. Front clutch drum 140 is also connected by rigid connecting means, as indicated at 150, to the front sun gear 114.

The clutch 140 is normally disengaged, but is adapted to be engaged to lockup the front planetary gearset by fluid delivered to the clutch by a conduit 46. A brake band 154 is selectively engageable and releasable with respect to the drum 134.

The rear clutch assembly, generally designated 155, is adapted to lockup the rear planetary gearset and includes clutch plates 156 rotatable with a rearward extension 158 of the cage 125, and coacting clutching portions including an outer drum 160 rigidly connected to the sun gear hub extension 148. The clutch 155 is also normally disengaged, but adapted to be engaged by fluid delivered thereto under pressure through a conduit 47. Tubular shaft 148 is rotatably mounted upon and encircles the output shaft 130 and coacts with the overrunning clutch 146, as previously indicated, and also with a second overrunning clutch 164 which provides a one-way driving connection with a brake drum 165, adapted to be selectively held or released by a brake band 166. Overrunning clutches 146, 164 prevent rearward rotation of members 145, 148, respectively, but permit forward rotation thereof, when drum 165 is held by band 166.

It will be appreciated that with this transmission arrangement, when the brake band 166 is applied to hold drum 165 stationary, which is always the case during forward drive, and with both of the clutches 140, 155 released, a low speed, high torque drive is transmitted from the engine shaft 102 through the torque converter to the ring gear 112. Ring gear 112 rolls the planetary gears 116 on the sun gear 114, rearward rotation of which is prevented by the reversely acting overrunning clutches 146, 164, which transmit the reaction to the brake band 166. The rotation thus imparted to the cage 115 is transmitted in similar manner through the rear planetary gearset, the cage 115 turning the ring gear 122 which rolls the planetary gears 126 on the sun gear 124 to turn the cage 125 and thus the output shaft 130. Again, the reaction imparted to the sun gear 124 is transmitted to the brake band 166 through hub 148 and overrunning clutch 164.

If one of the clutches as 140 is engaged while the other clutch 155 remains disengaged, one of the planetary gearsets becomes locked up, and under the supposed conditions, the only reduction occurs in the rear planetary gear set, and a higher speed intermediate drive is afforded. If both of the clutches 140, 155 are engaged, both gearsets are locked up, and a direct drive is afforded through the transmission. Throughout this specification, the terms "higher speed ratio" and "lower speed ratio," and the terms "higher ratio" and "lower ratio" are intended to refer to the speed ratio which the output drive bears to the input drive. Correspondingly, "up-shifting" refers to an increased ratio of output speed to input speed and the converse meaning of course is connoted by the expression "down-shift" or "down-shifting."

At all times in forward drive, the band 166 is engaged with the drum 165. For reverse drive, it is merely necessary to release the band 166 and engage the band 154 to prevent rotation of the front cage 115, the clutches 140, 155 remaining disengaged. The present invention is not concerned with the mode of actuation of the brake bands 154, 166, which may be manually controlled by suitable mechanism, not shown, to enable the driver to select manually between forward and reverse drives. In reverse, the cage 115 acts as a stationary reaction element and the sun gear 114 is driven in the reverse direction, transmitting a reverse drive through the overrunning clutch 146 to the sun gear 124. It will be noted that the ring gear 122 of the rear unit is connected by the shaft 120 to the cage 115, so that ring gear 122 is also held when brake band 154 is engaged. Reverse rotation of the rear sun gear 124, therefore, rolls the rear planetary gears in a reverse direction upon the internal toothed gear 122 to transmit reverse rotation to the cage 125 and output shaft 130.

Figure 3:
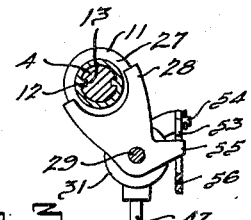
Fig. 3 is a cross section taken substantially on the line 3—3 of Fig. 2 and looking in the direction of the arrows.
Figure 2:
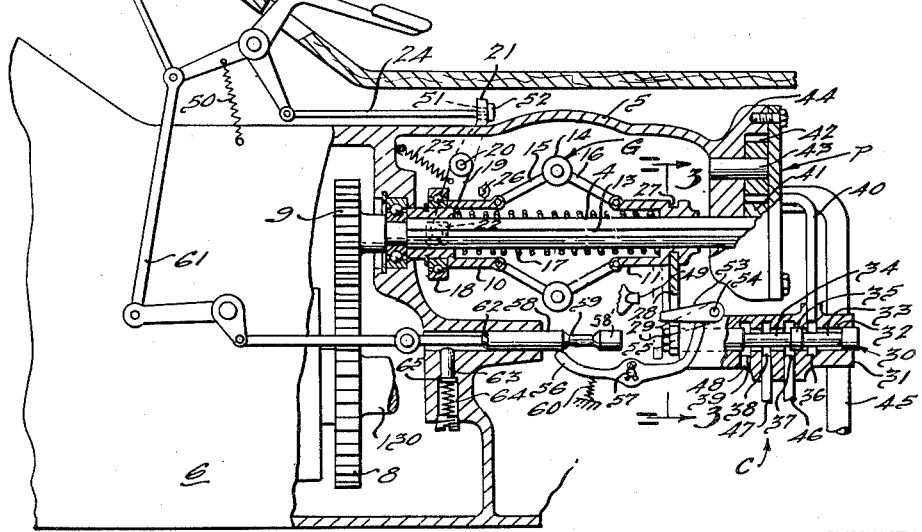
Fig. 2 is a somewhat diagrammatic vertical sectional elevational view of the control mechanism and associated parts.

The output shaft 130 may carry fast thereupon a driving gear 8 for the speed responsive governor mechanism of the control system. A preferred embodiment of the control system is illustrated in Figs. 2 and 3, wherein the centrifugal governor is generally designated G, while the valvular hydraulic control mechanism for selectively engaging and disengaging the clutches 140, 155 to control and cause shifting of the ratios of the transmission in response to the action of the governor mechanism is generally designated C. A pump, generally designated P, supplies fluid under suitable pressure for engaging the clutches. It will be appreciated that mechanical details of these and other parts of both the control system and the transmission mechanism are subject to variation, but considering the details of the preferred control mechanism illustrated, it will be noted that the governor shaft 4 is rotatably mounted in a housing 5 which may constitute a rearward extension of the housing for the transmission system previously described. The governor shaft is driven by a gear 9 meshing with the gear 8 on the transmission output shaft, so that the governor rotates at a speed proportional to the speed of the vehicle.

Keyed on the governor shaft 4 are two longitudinally slidable brackets 10 and 11. Keys as 12 on the brackets fit into a keyway 13 of the governor shaft to cause rotation of the brackets by the governor shaft. Governor weights 14 have arms 15 and 16 extending to the brackets 10 and 11 and are so pivoted that when the governor shaft is rotated the centrifugal force of the weights will tend to move the weights away from the axis of the governor shaft which will tend to move the brackets closer together. A helical compresion spring 17 between the brackets tends to oppose this movement. Upon one of the brackets 10, hereinafter referred to as the accelerator bracket, is mounted a bearing 18. An inside lever 19 is fastened to a shaft 20 that extends outside the housing 5, and an outside lever 21 is also fastened to the shaft 20. The inside lever 19 extends downwardly from the shaft 20 and at its lower end has a pivoted yoke 22, which engages the outer race of the ball bearing 18, and as the outside lever extends upwardly it will be understood that moving the outside lever to the left, as viewed in Fig. 2, will move the accelerator bracket 10 axially on the governor shaft to the right. A tension spring 23 fastened to the housing 5 and inside lever 19 tends to hold the accelerator bracket 10 to the left. A suitable linkage 24 connects the outside lever 21 with an accelerator 25 of the vehicle in such a way that depressing the accelerator will move the outside lever 21 to the left which, as explained above, will move the accelerator bracket 10 to the right. A stop 26, extending from the housing, limits the travel of the accelerator bracket 10 to the right when the stop engages the inside lever 19.

The other bracket 11, hereinafter referred to as the control bracket, has an annular groove 27 into which extends a yoke 28 that is fastened at its other end by means of a bolt 29 to a control valve 30 that is axially movable in a valve body 31, and therefore a movement of the control bracket to the left will cause a movement of the control valve 30 to the left. The control valve 30 fits closely but slidably in a bore 32 extending longitudinally through the valve body, and has two grooves 33 and 34 between which is a land 35. In the bore 32 of the valve body are four annular grooves 36, 37, 38 and 39. The annular groove 36, farthest to the right, connects by means of a conduit 40 with pump P constituting a source of hydraulic or oil pressure and which may consist of a conventional type gear pump that may be driven from the governor shaft 4, to which is fastened a pump drive gear 41, that meshes with a pump idler gear 42, which may rotate on a stub shaft 43. These gears are enclosed in pump body 44 which has an intake pipe 45 connected with the intake side of the pump and extending into the sump of the transmission. The pump may, therefore, draw oil from the sump and deliver oil under pressure by means of the conduit 40, to the annular groove 36. The next annular groove 37 (to the left) is connected with conduit 46 which leads to the first clutch 140 of the transmission when oil pressure exists in the conduit, and to release the said first clutch when the oil is drained from this conduit. The third annular groove 38, from the right, is connected with conduit 47 which leads to the second clutch 155 of the transmission when oil pressure exists in this conduit, and to release the said second clutch when the oil is drained from this conduit. The annular groove 39, farthest to the left, is connected with a drain port 48 through which oil may drain into the sump.

In Fig. 2, the control valve 30 is shown in its extreme position to the right and any oil pressure in the annular groove 36 is sealed by means of the land 35 from the annular grooves 37 and 38 which are in communication with the drain port 48. Therefore, both clutches in the transmission will be disengaged and, as previously stated, the transmission will be in low speed ratio.

If the control valve 30 is moved part way to the left until the land 35 is between the annular grooves 37 and 38, oil pressure enters the conduit 46 to engage the first clutch 140 of the transmission. The communication to the drain port having been sealed by the land 35, however, the conduit 47 is still sealed from pressure and communicates with the drain port so the second clutch of the transmission is still disengaged. As previously explained, when the first clutch of the transmission is engaged and the second clutch of the transmission is disengaged, the transmission is in the intermediate speed ratio.

If the control valve 30 is thereafter moved farther to the left to where the land 35 is between the annular grooves 38 and 39, both the conduits 46 and 47 will communicate with the oil pressure, and will be sealed from the drain port by the land 35. Therefore both clutches 140, 155 of the transmission will be engaged and as previously explained, the transmission will be in high speed ratio.

Moving the control valve 30 to the right from its last mentioned position, at the extreme left, will cause a shiftdown progressively from high to intermediate to low speed ratio.

A stop 49 is provided to limit the travel of the control valve 30. Stop 49 may consist of a projection from the housing, located to obstruct the yoke 28 when the proper travel of the control valve has been reached.

The accelerator is provided with a return spring 50 that tends to hold the accelerator in its raised, minimum throttle position. The linkage 24, connecting the accelerator with the outside lever 21, is so constructed that the outside lever may overtravel the accelerator. The link 24 passes through a hole 51 in the outside lever 21 and has a button 52 of enlarged section beyond the hole. The tension spring 23 will tend to hold the outside lever 21 against the button and for any given accelerator setting, the outside lever, and thus the accelerator bracket 10 will assume a definite corresponding axial position on the governor shaft 4.

If centrifugal force, acting upon the weights 14, moves the weights outwardly away from the axis of the governor shaft 4, the control bracket 11 will tend to move from right to left thereby causing progressive shifts from low ratio to intermediate ratio, and to high ratio. The governor spring 17 reacts upon both the accelerator bracket 10 and the control bracket 11 with equal force as does the reaction of the centrifugal force of the weights. However, the accelerator bracket 10 has the added force of the tension spring 23 tending to hold this bracket as far to the left as the accelerator linkage will allow, and therefore the control bracket 11 together with the control valve 30 will always move as far as possible to the left, for any given accelerator setting, and the flyweights cannot induce any movement of the accelerator bracket 10 to the right until after yoke 28 strikes stop 49. If such movement of bracket 10 does occur, the outside lever 21 may override the link 24, and thus have no effect on the accelerator, and such movement is limited to where the inside lever 19 strikes the stop 26. This stop may also be used to limit the travel of the accelerator.

Depressing the accelerator, and thereby moving the accelerator bracket to the right, increases the reaction of the governor spring 17 on the control bracket 11, and it therefore requires more centrifugal force, or governor speed, to obtain the progressive shifting, and as the governor speed is proportioned to the speed of the vehicle, it follows that depressing the accelerator has the effect of requiring greater vehicle speeds to obtain progressive upshifts.

With the vehicle traveling at relatively slow speeds, it may be possible, by depressing the accelerator, to cause a shift from high ratio to low ratio, or from intermediate ratio to low ratio. Such shifts into low ratio are not always desirable, especially if the vehicle drive includes a hydraulic torque converter in conjunction with gearing, as for example in the transmission illustrated in Fig. 1. I therefore provide modifying or auxiliary controlling means to prevent such shiftdown except under certain conditions that are controllable by the operator. The auxiliary controlling means may be varied in its construction and operating characteristics to best suit the transmission and hydraulic torque converter to be used therewith. For instance, if the hydraulic torque converter is one which does not have very great torque increasing capacity, the auxiliary controlling means would preferably be constructed to allow the vehicle to always start in low ratio, but after reaching sufficient speed for the transmission to shift into intermediate ratio, or high ratio, would prevent the transmission from again shifting into low ratio until, with the accelerator raised, the car was brought to a stop. Such a construction also preferably provides for allowing a shiftdown to low ratio if the operator depresses the accelerator past a detent, positioned in the accelerator travel to inform the operator that full throttle has been reached, and thus allowing a shiftdown to low ratio at full throttle when the vehicle is pulling a steep grade, or the operator wishes to allow an acceleration in low ratio.

On the other hand, if the torque converter is one that has a relatively high torque increasing capacity, it may be desirable, under ordinary driving conditions, to always start the vehicle in intermediate ratio, and only start in the low ratio in cases of emergency such as starting in heavy mud, or on a very steep grade. Constructions that accomplish this, also preferably include the feature of allowing a shiftdown to low ratio at full throttle, when the operator depresses the accelerator past the detent.

The construction illustrated in Fig. 2 is in the first mentioned category and includes a pawl 53 that is pivotally mounted on a fixed pin 54. The yoke 28 is provided with an extension 55 which cooperates with the pawl as follows: When the pawl is in its up position as shown in full lines in Fig. 2, the extension, and thus the control valve 30, is free to move without touching the pawl. When the pawl is allowed to drop to the dotted line position of Fig. 2 and the control valve is in its low ratio position as shown in full lines in Fig. 2, the weight of the pawl will cause it to rest lightly upon the upper surface of the extension 55 and the control valve may move to the left without interference from the pawl; however, if the control valve moves to the left far enough to attain its intermediate ratio position (see Fig. 4), the end of the pawl will drop below the upper surface of the extension 55 and prevent the control valve from again moving to the right, and thus prevent a shiftdown to low ratio, until the pawl is again moved to its up position. The pawl is moved or held in its up position, or alowed to drop and interlock the extension, by a rocker arm 56 which is centrally pivoted on a fixed pin 57. The right end of the rocker arm extends under the pawl and the other end of the rocker arm extends to a position to engage a slidable cam rod 58. Rod 58 is provided with a reduced portion 59 joined to the remainder of the rod by inclined walls and so arranged that moving the cam member axially will cause the rocker arm to hold the pawl in or move it to its up position or allow the pawl to drop. One end of the rocker arm is urged against the cam member by means of a spring 60, and this tends to move the other end of the rocker arm downwardly to allow the pawl to drop. The cam member is moved axially by connecting the same by means of a suitable linkage 61 with the accelerator pedal 25, and in the construction shown in Fig. 2, the cam portion is so arranged that when the accelerator is in its minimum throttle position, as shown, the pawl will be in its up position, because the rocker arm engages a full-diameter portion of rod 58, but only slightly depressing the accelerator will bring the reduced portion 59 in line with the end of the rocker arm and alow the pawl to drop. When the accelerator pedal is depressed beyond a detent position that gives substantially wide open throttle, another full-diameter portion 58' of the rod will engage the rocker arm to again raise the pawl to its up position.

A detent is provided in the accelerator travel and may be constructed as part of the cam member 58, which is actuated by the accelerator, by decreasing the diameter of another portion of the cam member so as to form an inclined shoulder 62. A plunger 63, mounted to move in a hole in the housing, is urged toward the axis of the cam member by means of a spring 64. The plunger has a head 65 that prevents the plunger from touching the decreased diameter of the cam member, but when the cam member is moved a certain distance to the left by the accelerator, the inclined shoulder 62 will strike the plunger which now must move to compress the spring 64 which requires the operator to exert an additional force upon the accelerator. The position of the accelerator at which the inclined shoulder strikes the plunger is the detent position which is located in respect to the accelerator travel at about the point at which the throttle valve is wide open.

An overtravel for the throttle valve, past its wide open position, is provided so that the operator may depress the accelerator past the wide open throttle position, to move the pawl to its up position and allow a shift to low ratio, provided of course the conditions of the primary controlling means are such as to cause a shift to low ratio. The overtravel for the throttle valve may consist of a throttle rod 66, at one end attached to the accelerator 25, and the other end attached to a throttle valve lever 67 which actuates the engine throttle 68. The throttle rod 66 passes through a hole in a member 69 trunnioned in the end of the throttle valve lever 67. An enlarged diameter button 70 fastened on the throttle rod 66 will move the throttle valve lever in a throttle valve closing direction, however, the moving of the throttle valve lever in a throttle valve opening direction is accomplished by the pressure of a spring 71 placed between the member 69 and a collar 72 fastened to the throttle rod 66. Depressing the accelerator may move the throttle valve lever as far as stop 73, at which position the throttle valve will be substantially wide open, however, the accelerator may be depressed beyond this point as the throttle rod 66 may slide in the hole in the member 69, compressing the spring 71.

When the cam portion 59 is constructed as illustrated in Fig. 2, the elements of the control mechanism will be in a position shown in Fig. 2 when the vehicle is at rest. When the operator wishes to start the vehicle, he depresses the accelerator which allows the pawl 53 to drop, and when the vehicle has reached a speed that will cause a shift from low to intermediate ratio, the operator may continue to drive with normal shifts between high ratio and intermediate ratio, and may accelerate at full throttle by depressing the accelerator to the detent position knowing that there will not be a shiftdown into low ratio, unless he desires such a shiftdown to low ratio and purposely depresses the accelerator past the detent, which will lift the pawl 53 to its up position allowing the control valve to return to the low ratio position. When the operator wishes to stop the vehicle, he raises his foot from the accelerator which will lift the pawl 53 to its up position, allowing a shiftdown to low ratio as the vehicle comes to a stop, and when the operator again depresses the accelerator to start the vehicle, it will start in low ratio.

The reduced cam portion may be modified by lengthening it at the left end, to the form indicated at 59A in Fig. 4, so that even with the accelerator pedal raised, the left arm of the rocker remains in engagement with the reduced section of the cam. This allows the pawl 53 to remain dropped even though the accelerator is in the throttle closing position. As the vehicle comes to rest with this modified arrangement, the latch will prevent a shiftdown to low ratio and therefore the vehicle will restart in intermediate ratio, unless the operator purposely wishes to start in low ratio, in which event he depresses the accelerator past the detent position, so that the pawl is lifted due to engagement of the arm 56 by the enlarged portion 58'.

A manual control may also be provided, as also shown in Fig. 4, including a lever 74 placed in a convenient position for the operator. A suitable linkage such as a rod or control wire 75 extends from the lever 74 to button 76, guided by a bracket 77 to strike a rearward extension 78 of the pawl 53. The lever 74 has two positions, an up position and a down position (the latter shown dotted).

When the lever 74 is in the up position, the button 76 is away from the extension 78 and the pawl 53 may operate according to the accelerator movement. When the lever 74 is in the down position, the button 76 will strike the extension so as to continuously hold the pawl in its up position.

With such a manual control, it is possible for the operator, even with the cam form 59A, to start the vehicle in low ratio by moving the lever 74 to the down position, without depressing the accelerator past the detent. Some operators may find it more desirable to drive with the lever 74 in its down position when driving on mountainous roads, which will cause the shifting only by the primary controlling means; and find it more desirable to drive with the lever 74 in its up position when driving in traffic, which will allow the auxiliary controlling means to influence the primary controlling means to prevent unwanted shiftdowns to low ratio when driving at lower speeds under relatively light load conditions.

In the modification shown in Fig. 5, the positive locking means for preventing downshifting is eliminated and a similar effect is achieved by spring means so arranged as to impose greater resistance to movement of the control valve from the intermediate ratio to the low ratio position. An extension 231 formed upon the right-hand end of the valve body 31, as the parts are viewed in Fig. 5, contains a chamber 232 coaxial with the bore 32 in which the valve 30 is slidable. The chamber 232 is also cylindrical but is of larger diameter than the bore 32 so that a shoulder 234 is formed at the right-hand end of the valve bore 32, defining the juncture of the chambers 32, 232. A hollow spool 235 slidable in the chamber 232 acts as a container for a helical compression spring 236 and as a thrust member through which the effort of spring 236 is applied to the right-hand end of the valve 30. Leftward movement of the spool 235 is limited by the shoulder 234 and the spring accordingly tends to move the spool to this position, in which it is shown in full lines in Fig. 5. This position corresponds to the position in which the valve member 30 is in the intermediate speed position, as also shown in Fig. 5, wherein communication is established between the pump P and the conduit 46 leading to the clutch 140.

The governor functions normally or as in the previously described embodiments in shifting the valve between the intermediate and high speed positions, but the strength of the spring 236 is such that only when the accelerator is well depressed and the car is traveling below a given speed will the governor spring 17 have sufficient force to overcome the spring 236 and move the valve 30 all the way to the right, to the low speed position.

A detent may be provided for the accelerator pedal to indicate the full throttle position, such detent being diagrammatically indicated at 65², and spring 236 may be so designed that only by depressing the accelerator pedal past the detent can the shift to low speed ratio be accomplished.

When a shiftdown to the low speed ratio has been made with this embodiment of the invention, the governor control will automatically cause an upshift to intermediate when the car speed reaches a predetermined ratio, or in event the operator lets up on the accelerator pedal. Conversely, when the torque demand is high and the engine is working at full throttle, as for example when climbing a steep grade, with the accelerator pedal depressed beyond the detent, if the speed of the vehicle decreases below a predetermined value, which is dependent upon the characteristics of the spring 236, the governor control will automatically shift the valve to the low speed position as the spring 17 overcomes the effort of the flyweights 14. The effect of the spring 17 being at this time augmented by the movement of the accelerator bracket 10 to the right, the resistance of spring 236 is overcome to effect the shift to the low speed ratio in the manner previously described.

Where the transmission incorporates a hydrokinetic torque converter, it may be desirable to arrange the control system so that under normal conditions the car is started with the gearing in the direct drive ratio. This may be accomplished by modifying the construction shown in Fig. 4 to lengthen the pawl 53, as shown for example in Fig. 6, so that when the lengthened pawl, designated 53a in Fig. 6, falls below the extension 55 of the yoke 28, the pawl will prevent downshifting movement of the control valve 30 to the right after the valve has been moved to the direct drive position in which the land 35 is located between the grooves 38 and 39. With the valve in this direct drive position, both of the clutches 140, 155 are engaged and the gear transmission is in direct drive, as previously noted.

It will also be appreciated that a similar effect can be achieved, with a mechanism of the type illustrated in Fig. 5, by lengthening the portion of the spool which projects into the valve chamber 32 sufficiently so that the spool engages the right end of the control valve 30 when the valve is in the high speed position.

Figure 6:
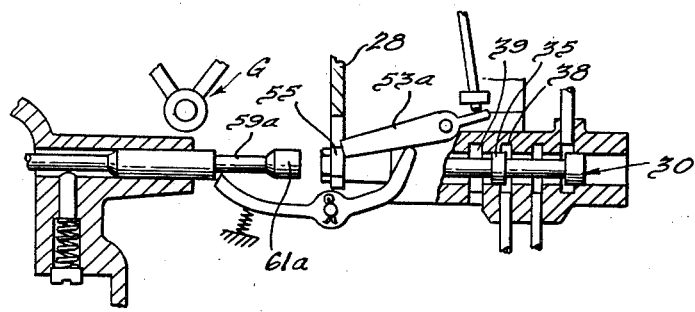
Fig. 6 is a somewhat diagrammatic sectional view of the control valve and valve actuating means of a control system of somewhat modified construction.

The blocking spool arrangement of Figure 5 can also be used with the latch arrangement of Figure 6, so that the latch will oppose downshifting from high to intermediate and the spool 235 will oppose downshifting from intermediate to low.

It will also be recognized that the high speed lock arrangement of Fig. 6 may, if desired, be made to function only in the middle range of throttle opening, as in the case of Fig. 2, by employing a cam portion more analogous to the cam 59 of Fig. 2, wherein the reduced section which engages the pawl actuating finger 56 is shorter and joined to the left end of the cam plunger by an inclined wall, so that the finger is actuated to lift the pawl 53 when the accelerator pedal is fully released.

Figure 7:
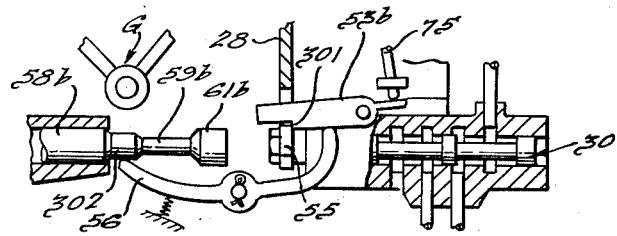
Fig. 7 is a view similar to Fig. 6, but showing another modified construction.

The invention is also adapted to be arranged to block downshifting from more than one ratio. Such an arrangement is shown in Fig. 7, wherein again the control valve 30 and many of the parts may correspond to those employed in the previous embodiments. In Fig. 7, the valve is shown in the intermediate speed position, where it is held against down-shifting by a notch-like abutment 301 formed on the lower edge of the pawl 53b, such pawl being long enough to also block the yoke 28 in the high speed position when the yoke has moved all the way to the left to permit the pawl to drop down to the position wherein the end of the pawl blocks return of the yoke extension portion 55. The cam plunger 58b, which actuates the finger 56 in the embodiment of Fig. 7, is also modified by the provision of a stepped land of intermediate diameter, designated 302, at the left end of the reduced portion 59b. The land 302 is so positioned that when the accelerator pedal is fully released, the pawl 53b is held in a position to block downshifting to a ratio lower than intermediate, although it does not block downshifting from high to intermediate when, with the accelerator pedal fully released, the car is slowed down to the high-intermediate downshifting speed. The reduced portion 59b prevents downshifting from high to intermediate in the middle throttle range, after the attainment of high speed, unless the accelerator pedal is pushed substantially to the floor, which lifts the pawl 53b entirely clear of the abutment 55 by bringing the terminal cam portion 61b of full diameter into engagement with the actuating finger 56. It will be recognized that when the accelerator pedal is thus substantially fully depressed, downshifting will occur at the speeds determined by the governor, modified by the downshifting effect resulting from the force exerted upon the accelerator collar 10 (Fig. 2), so long as the accelerator is maintained in such fully depressed position.

A manual supervisory control is preferably provided to permit downshifting to low ratio when maximum torque is desired, and this may be effected by a rod 75 operable by suitable means from the driver's compartment, as in the case of the embodiment of Fig. 4.

Figure 8:
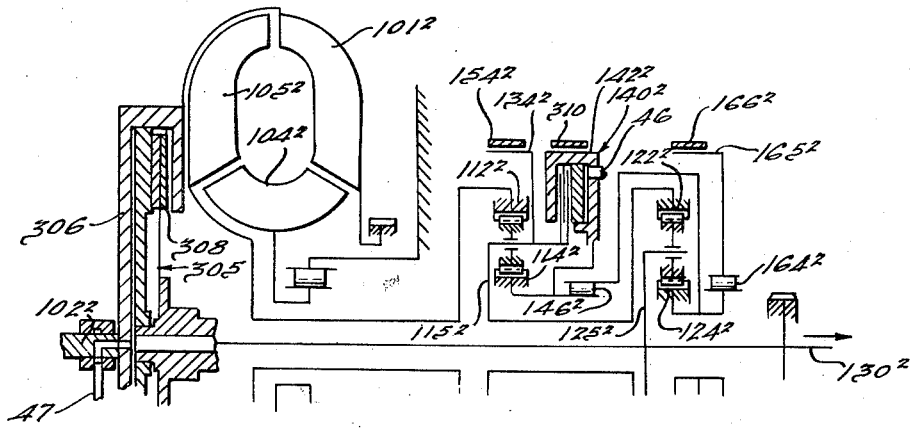
Fig. 8 is a view similar to Fig. 1 showing a transmission of modified construction adapted for use with my improved control system.

In Fig. 8, I have diagrammatically illustrated a transmission construction corresponding to the one shown in Fig. 3 of my aforesaid copending application Serial No. 748,382. This transmission is also adapted to be controlled by any of the control systems thus far discussed. Its operation is essentially similar to that of the transmission of Fig. 1 and a detailed consideration of its structure and operation is obtainable by reference to my aforementioned copending application. Parts analogous to those depicted in Fig. 1 are designated by like reference characters distinguished by the exponent 2. This transmission incorporates, in addition to the hydraulic torque converter, a fluid-actuatable direct drive friction clutch, generally designated 305, the driving element 306 of which turns as a unit with the pump element $101^2$ of the hydraulic torque converter. The driven plate 308 of the direct drive clutch is directly connected to the driven shaft $130^2$, while the driven turbine element $105^2$ of the hydraulic torque converter is connected as in the transmission of Fig. 1 to the internal toothed ring gear $112^2$ of a front planetary gear assembly. Such front planetary gear assembly is adapted to be locked up by a friction lock-up clutch $140^2$. The sun gear $114^2$ of the front planetary assembly is connected through an overrunning clutch $146^2$ to the sun gear $124^2$ of the rear planetary gear assembly. The planetary gear carrier $115^2$ of the front planetary unit is connected to the internal toothed ring gear $122^2$ of the rear unit, while the carrier $125^2$ of the rear unit is connected to the output shaft $130^2$. The carrier of the front planetary unit is connected to a brake drum $134^2$ which is adapted to be held against rotation by a brake band $154^2$. The sun gear $124^2$ of the rear planetary unit is connected through an overrunning clutch $164^2$ to a brake drum $165^2$ which is adapted to be held by a brake band $166^2$. Both of the overrunning clutches $146^2$ and $164^2$ act in a reverse direction, so that when band $166^2$ is engaged, the two sun gears are held against reverse rotation only. A two-way locked-up intermediate speed drive may also be provided by the incorporation of brake means adapted to hold the front sun gear against rotation in either direction. Such brake means is shown as comprising a drum portion $142^2$ forming the enclosure of the clutch $140^2$ and connected to the sun gear $114^2$, the drum $142^2$ being adapted to be held by a brake band 310.

With the transmission of Fig. 8, when all of the clutches and brake bands are released except the brake band $166^2$, the latter being engaged with the drum $165^2$, a low speed drive is afforded through the hydraulic torque converter and both of the planetary gearsets. Both of the sun gears are held against reverse rotation. The drive from the input shaft $102^2$ enters the torque converter through the pump $101^2$ and the drive from the turbine $105^2$ rolls the ring gear $112^2$ forwardly, turning the carrier $115^2$ from which the drive is taken to the rear ring gear $122^2$ and from the rear planetary unit through the carrier $125^2$ to the driven shaft $130^2$.

To provide an intermediate speed drive, the band $166^2$ remains engaged and the clutch $140^2$ is engaged to lock-up the first planetary unit. The drive is then through the same path as in the case of the first speed, except that the front planetary gearset is locked up and turns as a unit, and overrunning occurs at the one-way clutch $146^2$.

High-speed drive is afforded when the friction clutch 305 is engaged. The band $166^2$ and clutch $140^2$ may remain in engagement, although the operation in direct drive is the same even if these elements are released. This arrangement eliminates the inherent slip of the hydraulic torque converter in direct drive.

It will be understood that the bands and clutches may all be hydraulically actuatable and that if a control system such as that shown in Fig. 2 is employed with the transmission of Fig. 8, for example, the brake band $166^2$ may be initially applied by manually controllable or other suitable means, which means may also serve for selecting between forward and reverse drives, since the band $166^2$ may always be engaged during all forward speeds. Conduit 46 of Fig. 2 (or Fig. 5) may be connected to the fluid actuating means for the clutch $140^2$, as shown in Fig. 8, and the conduit 47 to the fluid actuating means for the clutch 305.

As in the previously described transmission of Fig. 1, reverse drive is obtainable by releasing the band $166^2$ and applying the band $154^2$ to hold the front planetary gear carrier $115^2$.

If desired, the manual supervisory control means may also incorporate means for selectively engaging the brake band 310 concurrently with band $166^2$, to afford a locked-up low speed drive with engine braking. Engagement of brake band 310 holds the front sun gear $114^2$ stationary against rotation in either direction, and the rear sun gear $124^2$ is also held against rotation in either direction, because of the fact that the rear sun gear is held against reverse rotation by the band $166^2$ acting through the overrunning clutch $164^2$ and is held against forward rotation by the band 310 acting through the overrunning clutch $146^2$. A double reduction is thereby afforded by the gearing, the front planet gears rolling on the sun gear $114^2$ and turning the rear ring gear $122^2$ which rolls the rear planet gears on the rear sun gear $124^2$ to turn the propeller shaft $130^2$ at reduced speed. Since both of the sun gears are held against rotation in either direction, the propeller shaft is also capable of acting through the gearing and the hydraulic torque converter to turn the engine upon deceleration, so that engine braking is available at all times in the locked-up drive.

Referring to Fig. 9, an exemplification is shown of the applicability of the invention to a hydrokinetic torque converter which is employed as the only torque-changing device, and in conjunction with which a direct drive friction clutch $305^3$ is employed. As in the embodiment of Fig. 8, the pump $101^3$ of the hydraulic torque converter is drivable as a unit with the driving element $306^3$ of the friction clutch $305^3$. Both the driven plate $308^3$ of the friction clutch and the driven turbine member $105^3$ of the hydraulic torque converter are connected directly to the output shaft $130^3$. The reaction member $104^3$ of the hydraulic torque converter is connected through an overrunnning brake $106^3$ to a stationary reaction portion $103^3$. The friction clutch $305^3$ is actuatable by fluid delivered through a conduit $47^3$ to a cylinder formed within the drum-like clutch driving portion $306^3$. The fluid serves to actuate a piston 315 which serves as a clutch pressure plate. Fluid is delivered from the conduit $47^3$ to the interior of the cylinder member $306^3$ through a suitable manifold as 316.

A valve $30^3$ contained in a casing $31^3$ is movable to connect the fluid pressure supply conduit $40^3$ to the conduit $47^3$ when the clutch $305^3$ is to be actuated. This, as will be apparent from Fig. 9, involves moving the valve $30^3$ to the left, from the clutch disengaged position shown in that view to a position in which the valve spool $35^3$ lies between the outlet port $38^3$ connected to the conduit $47^3$ and the vent port $39^3$. The valve may be so moved by an actuating mechanism corresponding to that shown in Fig. 2, and when so moved to the clutch engaged position, the pawl $53^3$ may be allowed to drop to blocking position behind the abutment portion $55^3$ to prevent the valve from returning to the clutch disengaged position until lifted by the finger piece $56^3$, the action of which may be controllable under the influence of the accelerator pedal, as also disclosed in connection with Fig. 2. It will be appreciated that with this arrangement the hydraulic torque converter is only employed when increased torque is required as, for example, after the vehicle has slowed down or come substantially to a standstill with the accelerator pedal raised or in response to movement of the accelerator pedal substantially all the way to the floor.

In Figs. 10 and 11, I have shown a modified valve construction, the principles of which may be incorporated in any of the control systems previously discussed. This modification incorporates means for introducing a differentiating factor between the high ratio upshift speed and the high ratio downshift speed. The valve 30⁴ is shown as substantially corresponding in construction to the valve 30 of Fig. 2, and its control may be under the influence of controlling mechanisms such as are shown in Fig. 2 and/or Fig. 5, the primary controlling influence being exerted upon the valve by an arm 28⁴ adapted to be moved by a governor whose action may be varied by modifying control elements, as previously described. The valve is in like fashion progressively movable to connect the fluid pressure supply conduit 40⁴ to the fluid-operable clutch feed conduits 46⁴, 47⁴. A vent or return port 39⁴ is provided to which the conduits 46⁴, 47⁴ are connected when they are not connected to the pressure fluid source. The valve is shown in Fig. 10 in the low speed position wherein the valve spool 35⁴ is to the right of the valve chambers 37⁴, 38⁴ leading respectively to conduits 46⁴, 47⁴.

One side of the valve casing 31⁴, shown at the top, is enlarged and drilled to provide an elongated cylinder 326 which accommodates a fluid actuatable plunger 325 which projects from the left end of the valve casing in position to be engageable with the inner face of the valve actuating arm 28⁴. The plunger is guided in the chamber 326 by spaced spools 328, 330, the latter of which serves as a piston and the right end of which is exposed to the interior of the chamber 38⁴.

When the spool 35⁴ lies to the right of the chamber 38⁴, the latter chamber is connected to the vent 39⁴ and no fluid pressure is exerted upon the piston 330. As the spool 35⁴ moves to the high speed position, however, and closes the vent 39⁴ and establishes communication between chamber 38⁴ and the source of fluid supply, the fluid supply pressure acting upon the right end of the piston 330 drives the plunger 325 to the left and against the arm 28⁴, augmenting the leftward upshifting influence exerted upon the valve through the arm 28⁴. This leftward influence resulting from the fluid pressure is maintained so long as the chamber 38⁴ is in communication with the source of fluid pressure supply and prevents or opposes a downshift until the speed of the vehicle has dropped considerably below the speed at which the upshift occurred, assuming of course that the other controlling factors remain substantially unchanged. It will be appreciated that this prevents any tendency on the part of the shift controlling means to hunt when the vehicle is being driven at a speed close to the critical shifting speed for the high ratio. The action of the plunger does not affect the upshift speed whatever, and it will be appreciated that the elimination of hunting is most advantageous, since it is an undesirable condition at all times, and it is particularly so when the car is under a substantial load, as in pulling a grade.

Although the construction of the plunger 325 and its actuating means is of course subject to variation and the same principles could be applied with diversified mechanism, I consider the use of spools 328 and 330 of restricted surface area highly advantageous since this construction tends to prevent sticking, which might otherwise be apt to occur, if a solid plunger-piston were used. Any dirt which finds its way into the system can be accommodated between or on either side of the spools, and the plunger and spool assembly are not subject to binding in event the hole or plunger are not perfectly straight.

While it will be apparent that the preferred etmbodiments of the invention herein disclosed are well calculated to fulfill the objects above stated, it will be appreciated that the invention is susceptible to modification, variation and change without departing from the proper scope of the subjoined claims.

What is claimed is:

1. In a control system for an automatic transmission having a plurality of speed ratios including a higher speed ratio and a lower speed ratio and adapted for installation in a vehicle having an engine, a throttle, and a throttle actuator for opening and closing the throttle to control the engine, ratio changing means shiftable to alter the speed ratio of the transmission, governing means, inhibiting means coacting with said governing means and said ratio changing means for preventing shifting of the transmission from a higher speed ratio to a lower speed ratio but permitting shifting from the lower to the higher speed ratio as influenced by the governing means, and means operatively interconnecting the throttle actuator and the inhibiting means to negate the effect of the latter and allow shifting to the lower speed ratio including a blocking member for preventing unwanted influence of a governor-operated part, and a release member for the blocking member, the release member being connected to the throttle actuator so as to be operable to release the blocking member concurrently with movement of the throttle actuator to both extreme positions, said release member having intermediate portions corresponding to intermediate throttle positions wherein said blocking member is moved to blocking position.

2. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, said governor including a pair of drifting bracket portions, and a flyweight means carried by and reacting differentially against both such bracket portions, whereby the entire assembly of both bracket portions and the flyweight means carried thereby is bodily shiftable, biasing means reacting against both bracket portions comprising yieldable force-transmitting means through which effort may be transmitted from one bracket portion to the other, a shift-control member connected to and operable by one of said bracket portions and movable to upshifting and downshifting positions, the throttle actuator being connected to the other of said bracket portions, said opposing element normally resisting downshifting movement of the shift control member.

3. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, said governor including a pair of drifting bracket portions, and a flyweight means carried by and reacting differentially against both such bracket portions, whereby the entire assembly of both bracket portions and the flyweight means carried thereby is bodily shiftable, biasing means reacting against both bracket portions comprising yieldable force-transmitting means through which effort may be transmitted from one bracket portion to the other, a shift-control member connected to and operable by one of said bracket portions and movable to upshifting and downshifting positions, the throttle actuator being connected to the other of said bracket portions, said opposing element normally resisting downshifting movement of the shift control member, said transmission having at least three speed ratios and said shift control member being progressively movable to a plurality of positions, one of which positions corresponds to each speed ratio, said opposing element reacting only to oppose movement of said shift control member to the lowest speed position.

4. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said transmission having at least three speed ratios and said ratio changing means including a shift control member comprising a valve progressively movable to a plurality of positions, one of which positions corresponds to each speed ratio, said opposing element comprising a spring-biased plunger having a travel limited to less than the travel of the valve and opposing movement of the valve to the lowest speed position only, and means limiting the rate of travel of the plunger and valve.

5. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said transmission having at least three speed ratios and said ratio changing means including a shift control member comprising a valve progressively movable to a plurality of positions, one of which positions corresponds to each speed ratio, said opposing element comprising a spring-biased plunger having a travel limited to less than the travel of the valve and opposing movement of the valve to the lowest speed position only.

6. In a control system for an automatic transmission having a plurality of speed ratios including a higher speed ratio and a lower speed ratio and adapted for installation in a vehicle having an engine, a throttle, and a throttle actuator for opening and closing the throttle to control the engine, ratio changing means shiftable to alter the speed ratio of the transmission, governing means, inhibiting means coacting with said governing means and said ratio changing means for preventing shifting of the transmission from a higher speed ratio to a lower speed ratio but permitting shifting from the lower to the higher speed ratio as influenced by the governing means, and means operatively interconnecting the throttle actuator and the inhibiting means to negate the effect of the latter and allow shifting to the lower speed ratio in response to an appreciably increased throttle actuator position, said ratio changing means including a shift control member comprising a valve, and said inhibiting means comprising a blocking member movable to and from a position to oppose downshifting.

7. In a control system for an automatic transmission having a plurality of speed ratios including a higher speed ratio and a lower speed ratio and adapted for installation in a vehicle having an engine, a throttle, and a throttle actuator for opening and closing the throttle to control the engine, ratio changing means shiftable to alter the speed ratio of the transmission, governing means, inhibiting means coacting with said governing means and said ratio changing means for preventing shifting of the transmission from a higher speed ratio to a lower speed ratio but permitting shifting from the lower to the higher speed ratio as influenced by the governing means, and means operatively interconnecting the throttle actuator and the inhibiting means to negate the effect of the latter and allow shifting to the lower speed ratio, said throttle actuator being movable to and beyond a full throttle position, said ratio changing means including a shift control member comprising a valve, and said inhibiting means comprising a blocking member movable, in response to movement of the throttle actuator to and from a position beyond full throttle position, from and to a position to oppose downshifting respectively.

8. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said ratio changing means including a shift control valve, said opposing element comprising a blocking member normally in blocking position when the throttle actuator is in an intermediate range of positions and movable from said blocking position in response to movement of the throttle actuator out of said intermediate range in either direction.

9. In a control mechanism for a transmission having a drive member, a driven member, and various driving relations between the drive and driven member for use with an engine having a throttle, the combination of a governor responsive to the speed of a member of the transmission, a valve movable by the governor for causing a certain driving relation in response to one position of the valve and a second driving relation in response to a second position of the valve, an inhibiting means for the valve for allowing free travel of the valve in one direction but preventing the valve from returning to the first named position once the second position has been reached, and means for connecting the said throttle with the said inhibiting means so as to remove the influence of the inhibiting means on said valve and allow the valve to return to the first named position in response to an appreciably open throttle position.

10. In a control mechanism for a transmission having a drive member, a driven member, and various driving relations between the drive and driven member for use with an engine having a throttle, the combination of a governor responsive to the speed of a member of the transmission, a valve movable by the governor for causing a certain driving relation in response to one position of the valve and a second driving relation in response to a second position of the valve, an inhibiting means for the valve for allowing free travel of the valve in one direction but preventing the valve from returning to the first named position once the second position has been reached, and means for connecting the said throttle with the said inhibiting means so as to remove the influence of the inhibiting means on said valve and allow the valve to return to the first named position in response to an appreciably closed throttle position.

11. In a control mechanism for a transmission having a drive member, a driven member, and various driving relations between the drive and driven member for use with an engine having a throttle, the combination of a governor responsive to the speed of a member of the transmission, a valve movable by the governor for causing a certain driving relation in response to one position of the valve and a second driving relation in response to a second position of the valve, an inhibiting means for the valve for allowing free travel of the valve in one direction but preventing the valve from returning to the first named position once the second position has been reached, and means for connecting the said throttle with the said inhibiting means so as to remove the influence of the inhibiting means on said valve and allow the valve to return to the first named position in response to an appreciably open throttle position, and an appreciably closed throttle position but maintaining the influence of said inhibiting means on the valve for throttle positions between the two position above mentioned.

12. In a control mechanism for a transmission having a drive member, a driven member, and a clutch for causing a certain driving relation between the drive member and the driven member when the clutch is disengaged and a different driving relation between such members when the clutch is engaged for use with an engine having a throttle and a throttle actuator for opening and closing the throttle to control the engine, the combination of a control means responsive to the speed of a member of the transmission for controlling the engagement and disengagement of the clutch, an inhibiting means for allowing the control means to cause clutch engagement but opposing clutch disengagement under the influence of the control means once the said clutch has been engaged, and means connecting the said throttle actuator with the said inhibiting means to actuate the inhibiting means to a position to permit disengagement of the clutch in response to an appreciably open throttle position.

13. In a control mechanism for a transmission having a drive member, a driven member, and a clutch for causing a certain driving relation between the drive member and the driven member when the clutch is disengaged and a different driving relation between such members when the clutch is engaged, for use with an engine having a throttle and a throttle actuator for opening and closing the throttle to control the engine, the combination of a control means responsive to the speed of a member of the transmission for controlling the engagement and disengagement of the clutch, an inhibiting means acting in one direction only for allowing the control means to cause clutch engagement but opposing clutch disengagement under the influence of the control means once the said clutch has been engaged, and means connecting the said throttle actuator with the said inhibiting means to actuate the inhibiting means to a position to permit disengagement of the clutch in response to substantially closed throttle position.

14. In a control mechanism for a transmission having a drive member, a driven member, and a clutch for causing a certain driving relation between the drive member and the driven member when the clutch is disengaged and a different driving relation between such members when the clutch is engaged for use with an engine having a throttle, the combination of a control means responsive to the speed of a member of the transmission for controlling the engagement and disengagement of the clutch, an inhibiting means for allowing the control means to cause clutch engagement but opposing clutch disengagement under the influence of the control means once the said clutch has been engaged, and means for connecting the said throttle with the said inhibiting means to actuate the inhibiting means to a position to permit disengagement of the clutch in response to an appreciably open throttle position and an appreciably closed throttle position but preventing the disengagement of the clutch for throttle positions between the two positions above mentioned.

15. In a control system for an automatic transmission having ratio changing means movable to at least three positions and a plurality of speed ratios including a higher speed ratio, and intermediate speed ratio and a lower speed ratio and adapted to be installed in a vehicle having an engine and a throttle for the engine, a throttle controlled governor for controlling the ratio changing means, means connecting the engine throttle with the governor in such a way that increased engine throttle will increase the tendency of the governor upon the ratio changing means to shift from a higher speed ratio to a lower speed ratio, and yieldable opposing means for the ratio changing means acting upon said ratio changing means through only a portion of the travel of the latter, for inhibiting shifting from a higher speed ratio to a next lower speed ratio only, except at appreciably increased engine throttle.

16. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said ratio changing means including a shiftable member, said opposing element comprising a blocking device movable to and from a position to block movement of said shiftable member, said interconnecting mechanism including a cam movable by the throttle actuator and operatively connected with said blocking device to actuate the latter.

17. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnetcing mechanism operatively interconnecting the throttle actuator and the opposing element to negate the effect of the latter and allow shifting, said ratio changing means including a fluid pressure operable system and a valve for controlling the action of said system and the shifting of the transmission, said valve being operable at least partly under the influence of said governor and progressively movable to vary the torque output of the transmission, a latch member movable to and from blocking relation with respect to said valve, said latch member being biased to such blocking relation, and a cam actuatable by said throttle actuator for releasing said latch member.

18. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said ratio changing means including a fluid pressure operable system and a valve for controlling the action of said system and the shifting of the transmission, said valve being operable at least partly under the influence of said governor and progressively movable to vary the torque output of the transmission, a latch member movable to and from blocking relation with respect to said valve, said latch member being biased to such blocking relation, and a cam actuatable by said throttle actuator for releasing said latch member, said cam having a plurality of latch releasing portions spaced from one another to release said latch member at each of a plurality of different throttle positions.

19. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said ratio changing means including a fluid pressure operable system and a valve for controlling the action of said system and the shifting of the transmission, said valve being operable at least partly under the influence of said governor and progressively movable to vary the torque output of the transmission, a latch member movable to and from blocking relation with respect to said valve, said latch member being biased to such blocking relation, and a cam actuatable by said throttle actuator for releasing said latch member, said cam having a plurality of latch releasing portions spaced from one another to release said latch member at each of a plurality of different throttle positions, including a position near each extreme of movement of the throttle actuator.

20. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting of the transmission throughout a part only of its torque varying range, and a second opposing element for opposing shifting of the transmission throughout a different portion of its torque changing range.

21. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting of the transmission throughout a part only of its torque varying range, and a second opposing element also connected to the throttle actuator for opposing shifting of the transmission throughout a different portion of its torque changing range.

22. In a control system for an automatic transmission having a range of torque conversion ratios, ratio changing means and a governor for exerting shifting tendencies upon the ratio changing means, said transmission being adapted for installation in a vehicle having an engine and a throttle actuator for controlling the engine, an opposing element for opposing unwanted changing of the transmission ratio, said opposing element having a plurality of spaced opposing portions, each of which portions is adapted to oppose shifting throughout a different torque converting range of the transmission, and interconnecting mechanism operatively interconnecting the throttle actuator and the opposing element to actuate the latter in separate steps to enable separately negating the effect of the opposing element with respect to each such part of the range of the transmission, to allow shifting of the transmission during a part of its range.

23. In a control system for an automatic transmission having a range of torque conversion ratios, ratio changing means and a governor for exerting shifting tendencies upon the ratio changing means, said transmission being adapted for installation in a vehicle having an engine and a throttle actuator for controlling the engine, an opposing element for opposing unwanted changing of the transmission ratio, said opposing element having a plurality of spaced one-way-acting opposing portions, each of which portions is adapted to oppose down-shifting only from a higher speed ratio to a lower speed ratio throughout a different torque converting range of the transmission, and interconnecting mechanism operatively interconnecting the throttle actuator and the opposing element.

24. In a control system for an automatic transmission having a range of torque conversion ratios, ratio changing means including a progressively movable ratio changing device, automatic speed changing means including an actuator for yieldably urging said device in one direction to induce up-shifting of the transmission and in the opposite direction to induce down-shifting of the transmission, and supplemental fluid actuatable servo motor mechanism adapted to react against said device to augment the shifting effort thereupon, including means for connecting said servo motor mechanism to a source of fluid under pressure in response to movement of said device to one extreme of its movement.

25. In a control system for an automatic transmission having a range of torque conversion ratios, ratio changing means including a progressively movable ratio changing device, automatic speed changing means including an actuator for yieldably urging said device in one direction to induce up-shifting of the transmission and in the opposite direction to induce down-shifting of the transmission, and supplemental fluid actuatable servo motor mechanism adapted to react against said device to augment the shifting effort thereupon, including means for connecting said servo motor mechanism to a source of fluid under pressure in response to movement of said device to one extreme of its movement, said ratio changing device comprising a valve for selectively diverting pressure fluid to different transmission components to vary the speed ratio of the transmission, said servo motor means comprising a fluid actuatable element movable to react against said valve, said valve being movable to and from a position to connect said fluid actuatable element to a source of fluid pressure in response to movement of the valve to and from a position corresponding to a relatively high speed ratio of the transmission, said fluid actuatable element reacting in a direction to tend to move the valve toward and maintain it in such relatively high speed ratio position.

26. In a control system for an automatic transmission having a range of torque conversion ratios, ratio changing means including a progressively movable ratio changing device, automatic speed changing means including an actuator for yieldably urging said device in one direction to induce up-shifting of the transmission and in the opposite direction to induce down-shifting of the transmission, and supplemental fluid actuatable servo motor mechanism adapted to react against said device to augment the shifting effort thereupon, including means for connecting said servo motor mechanism to a source of fluid under pressure in response to movement of said device to one extreme of its movement, said ratio changing device comprising a valve for selectively diverting pressure fluid to different transmission components to vary the speed ratio of the transmission, said servo motor means comprising a fluid actuatable element movable to react against said valve, said valve being movable to and from a position to connect said fluid actuatable element to a source of fluid pressure in response to movement of the valve to and from a position corresponding to a relatively high speed ratio of the transmission, said fluid actuatable element reacting in a direction to tend to move the valve toward and maintain it in such relatively high speed ratio position, said transmission having a plurality of definitely demarcated speed ratios, said valve having a plurality of outlet ports to which fluid from a suitable source may be progressively directed to effect up-shifting and down-shifting of the transmission, said servo motor mechanism including a piston arranged in a cylinder, one extremity of the cylinder being connected to an outlet port corresponding to a relatively high speed ratio, a part connected to said piston reacting against said valve in one direction only.

27. In a control system for an automatic transmission having a range of torque conversion ratios, ratio changing means including a progressively movable ratio changing device, automatic speed changing means including an actuator for yieldably urging said device in one direction to induce up-shifting of the transmission and in the opposite direction to induce down-shifting of the transmission, and supplemental fluid actuatable servo motor mechanism adapted to react against said device to augment the shifting effort thereupon, including means for connecting said servo motor mechanism to a source of fluid under pressure in response to movement of said device to one extreme of its movement, said ratio changing device comprising a valve for selectively diverting pressure fluid to different transmission components to vary the speed ratio of the transmission, said servo motor means comprising a fluid actuatable element movable to react against said valve, said valve being movable to and from a position to connect said fluid actuatable element to a source of fluid pressure in response to movement of the valve to and from a position corresponding to a relatively high speed ratio of the transmission, said fluid actuatable element reacting in a direction to tend to move the valve toward and maintain it in such relatively high speed ratio position, said transmission having a plurality of definitely demarcated speed ratios, said valve having a plurality of outlet ports to which fluid from a suitable source may be progressively directed to effect up-shifting and down-shifting of the transmission, said servo motor mechanism including a piston arranged in a cylinder, one extremity of the cylinder being connected to an outlet port corresponding to a relatively high speed ratio, a part connected to said piston reacting against said valve in an up-shifting direction only.

28. In a control system for an automatic transmission having a range of torque conversion ratios, ratio changing means including a progressively movable ratio changing device, automatic speed changing means including an actuator for yieldably urging said device in one direction to induce up-shifting of the transmission and in the opposite direction to induce down-shifting of the transmission, and supplemental fluid actuatable servo motor mechanism adapted to react against said device to augment the shifting effort thereupon, including means for connecting said servo motor mechanism to a source of fluid under pressure in response to movement of said device to one extreme of its movement, said ratio changing device comprising a valve for selectively diverting pressure fluid to different transmission components to vary the speed ratio of the transmission, said servo motor means comprising a fluid actuatable element movable to react against said valve, said valve being movable to and from a position to connect said fluid actuatable element to a source of fluid pressure in response to movement of the valve to and from one extreme limit of its movement corresponding to high speed ratio of the transmission, said fluid actuatable element reacting in a direction to tend to move the valve toward and maintain it in such high speed ratio position.

29. In a control system for an automatic transmission having at least three speed ratios including a high speed ratio, an intermediate speed ratio and a lower speed ratio, ratio changing means movable to at least three positions corresponding to said three ratios, and a governor for exerting shifting tendencies upon the ratio changing means, said transmission being adapted for installation in a vehicle having an engine and a throttle actuator for controlling the engine, an opposing element for opposing shifting of the transmission from one ratio to another, and interconnecting mechanism operatively interconnecting the throttle actuator and the opposing element to negate the effect of the latter and allow shifting, said ratio changing means including a shiftable member, said opposing element comprising a blocking device movable to and from a position to block movement of said shiftable member, said interconnecting mechanism including a cam movable by the throttle actuator and operatively connected with said blocking device to actuate the latter.

30. In a control system for an automatic transmission having a plurality of speed ratios including a higher speed ratio and a lower speed ratio and adapted for installation in a vehicle having an engine, a throttle, and a throttle actuator for opening and closing the throttle to control the engine, ratio changing means shiftable to alter the speed ratio of the transmission, governing means, inhibiting means coacting with said governing means and said ratio changing means for preventing shifting of the transmission from a higher speed ratio to a lower speed ratio but permitting shifting from the lower to the higher speed ratio as influenced by the governing means, and means operatively interconnecting the throttle actuator and the inhibiting means to negate the effect of the latter and allow shifting to the lower speed ratio in response to substantially full opening of the throttle.

31. In a control system for an automatic transmission having a plurality of speed ratios including a higher speed ratio and a lower speed ratio and adapted for installation in a vehicle having an engine, a throttle, and a throttle actuator for opening and closing the throttle to control the engine, ratio changing means shiftable to alter the speed ratio of the transmission, governing means, inhibiting means coacting with said governing means and said ratio changing means for preventing shifting of the transmission from a higher speed ratio to a lower speed ratio but permitting shifting from the lower to the higher speed ratio as influenced by the governing means, and means operatively interconnecting the throttle actuator and the inhibiting means to negate the effect of the latter and allow shifting to the lower speed ratio in response to opening movement of the throttle actuator, said inhibiting means including a blocking member for preventing unwanted influence of a governor-actuated part, and a release member for the blocking member, the release member being connected so as to be operable by the throttle actuator.

32. In a control system for an automatic transmission having a plurality of speed ratios including a higher speed ratio and a lower speed ratio, ratio changing means and a governor for exerting shifting tendencies upon the ratio changing means, said transmission being adapted for installation in a vehicle having an engine and a throttle actuator for controlling the engine, an inhibiting means for opposing shifting of the transmission from at least one ratio to another, and interconnecting mechanism operatively interconnecting the throttle actuator and the inhibiting means to negate the effect of the latter and allow shifting, said ratio changing means including a shift control valve, said inhibiting means comprising a blocking member normally in blocking position to offset the influence of the control valve when the throttle actuator is in an intermediate range of positions and movable from said blocking position in response to movement of the throttle actuator to a position for open throttle.

33. In a control system for an automatic transmission having a plurality of speed ratios including a higher speed ratio and a lower speed ratio, and fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism for controlling the fluid pressure to the ratio changing means for automatic upshifting and downshifting and for engaging either the higher speed ratio or the lower speed ratio, and including inhibiting means for preventing automatic downshifting to the lower speed ratio thereby initially adapting the fluid controlling mechanism for engaging the higher speed ratio for starting the vehicle, interconnecting means operatively interconnecting the throttle actuator, and the fluid controlling mechanism for controlling said inhibiting means whereby automatic downshifting to the lower speed ratio may be accomplished only in response to a throttle actuator position that attains substantially full-open throttle, a governing device adapted to impart upshifting tendencies to the fluid controlling mechanism responsive to vehicle speed, and opposing mechanism adapted to impart downshifting tendencies on the fluid controlling mechanism, said upshifting and downshifting tendencies reacting so as to provide for automatic upshifting and downshifting as a result of the combined influence of the tendencies, whereby in response to the said throttle actuator position the said automatic downshifting to the lower speed ratio will occur when the vehicle is not exceeding a certain speed and automatic upshifting from the lower speed ratio will occur when the vehicle attains a certain speed, and a resisting element adapted for yieldably resisting movement of the throttle actuator when moving in a throttle opening direction upon the attainment of a position close to the said position at which automatic downshifting to the lower speed ratio may occur, denoting the attainment of substantially full-open throttle with which automatic downshifting to the lower speed ratio will not occur.

34. In a control system for an automatic transmission having a plurality of speed ratios including a higher speed ratio and a lower speed ratio, and a fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism for controlling the fluid pressure to the ratio changing means for automatic upshifting and downshifting and for engaging either the higher speed ratio or the lower speed ratio, and including elements adapted to prevent or permit automatic downshifting to the lower speed ratio, interconnecting mechanism operatively interconnecting the throttle actuator and the fluid controlling mechanism so as to adapt the said elements for permitting automatic downshifting to the lower speed ratio only in response to a throttle actuator position that attains substantially full-open throttle, a mechanism adapted to impart downshifting tendencies on the fluid controlling mechanism, and a governing device adapted to impart upshifting tendencies on the fluid controlling mechanism responsive to vehicle speed, said upshifting and downshifting tendencies reacting so as to provide for automatic upshifting and downshifting as a result of the combined influence of the tendencies, whereby automatic upshifting from the lower speed ratio may occur when the vehicle attains a certain speed and whereby the said automatic downshifting to the lower speed ratio will not occur when the vehicle exceeds a certain speed.

35. In a control system for an automatic transmission having a plurality of speed ratios including a higher speed ratio and a lower speed ratio, and fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism including valve means for controlling the fluid pressure to the ratio changing means so as to provide for upshifting and downshifting and for engaging either the higher speed ratio or the lower speed ratio, elements adapted to prevent or permit automatic downshifting to the lower speed ratio, interconnecting mechanism operatively connecting the throttle actuator so as to control the said elements whereby they become adapted for permitting automatic downshifting to the lower speed ratio only in response to a throttle actuator position that attains substantially full-open throttle, mechanism for exerting force tending to actuate the valve means for downshifting, and a governing device adapted to impart force whose magnitude is responsive to the vehicle speed, tending to actuate the valve means for upshifting, said forces reacting so as to actuate the valve means for automatic upshifting and downshifting whereby automatic upshifting from the lower speed ratio may occur when the vehicle attains a certain speed and whereby the said automatic downshifting to the lower speed ratio may not occur when the vehicle exceeds a certain speed.

36. In a control system for an automatic transmission having a plurality of speed ratios including a higher speed ratio and a lower speed ratio, and fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism including a control valve for controlling the fluid pressure to the ratio changing means shiftable in a downshifting direction to a position for controlling the fluid pressure for downshifting to the lower speed ratio and shiftable in an upshifting direction to a position for controlling the fluid pressure for upshifting to the higher speed ratio, a resilient means for exerting force on the control valve tending to urge the control valve in a downshifting direction and an opposing element adapted for exerting force on the control valve tending to urge the control valve in an upshifting direction, a governing device operatively connected with a driving member of the vehicle adapted to control the last-mentioned force so as to be progressively increased in response to progressively increased vehicle speed, both of the said forces reacting so as to provide a speed range for the vehicle above which the control valve can not be shifted to the position for downshifting to the lower speed ratio, elements for preventing the control valve from controlling the fluid pressure for downshifting to the lower speed ratio and actuatable to a condition adapting the control valve for controlling the fluid pressure for downshifting to the lower speed ratio and for upshifting to the higher speed ratio, actuating means for actuating the said elements to the said condition, and an interconnecting mechanism operatively interconnecting the throttle actuator and the fluid controlling mechanism, adapted to control the said actuating means whereby the said elements are not actuatable to the said condition except in response to a throttle actuator position that attains substantially full-open throttle.

37. In a control system for an automatic transmission having a plurality of speed ratios including a higher speed ratio and a lower speed ratio, and fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism including a controlled valve for controlling the fluid pressure to the ratio changing means shiftable in a downshifting direction to a position for controlling the fluid pressure for downshifting to the lower speed ratio and shiftable in an upshifting direction to a position for controlling the fluid pressure for upshifting to the higher speed ratio, a resilient means for exerting force on the control valve tending to urge the control valve in a downshifting direction and an opposing element adapted for exerting force on the control valve tending to urge the control valve in an upshifting direction, a governing device operatively connected with a driving member of the vehicle adapted to control the last-mentioned force so as to be progressively increased in response to progressively increased vehicle speed, both of the said forces reacting so as to provide a speed range for the vehicle above which the control valve can not be shifted to the position for downshifting to the lower speed ratio, elements for preventing the control valve from controlling the fluid pressure for downshifting to the lower speed ratio and actuatable to a condition adapting the control valve for controlling the fluid pressure for downshifting to the lower speed ratio and for upshifting to the higher speed ratio, actuating means for actuating the said elements to the said condition, and an interconnecting mechanism operatively interconnecting the throttle actuator and the fluid controlling mechanism, adapted to control the said actuating means whereby the said elements are not actuatable to the said condition except in response to a throttle actuator position that attains substantially full-open throttle, and in response to a throttle actuator position that attains substantially closed throttle.

38. In a control system for an automatic transmission having a plurality of speed ratios including a high speed ratio, and intermediate speed ratio and a low speed ratio, and ratio changing means for upshifting from a lower speed ratio to a higher speed ratio and downshifting from a higher speed ratio to a lower speed ratio, said transmission being adaptable for transmitting power to drive a vehicle from an engine having a throttle, a throttle actuator for opening and closing the throttle to control the engine, a controlling device having upshifting and downshifting tendencies for controlling the ratio changing means, said controlling device being operatively connected with a driving member of the vehicle and adapted for increasingly or decreasingly exerting upshifting tendencies in response to increases or decreases in vehicle speeds and also being operatively connected with the throttle actuator and adapted for increasingly or decreasingly exerting downshifting tendencies in response to various throttle actuator positions, said upshifting tendencies and downshifting tendencies reacting so as to control the ratio changing means whereby automatic upshifting and downshifting between the intermediate speed ratio and the high speed ratio is responsive to both vehicle speed and various throttle actuator positions, said controlling device including low speed ratio controlling elements adapted to control downshifting from the intermediate speed ratio to the low speed ratio whereby automatic downshifting to the low speed ratio is responsive to vehicle speed and only to a throttle actuator position that attains substantially full-open throttle.

39. In a control system for an automatic transmission having a plurality of speed ratios including a high speed ratio, an intermediate speed ratio and a low speed ratio, and ratio changing means for upshifting from a lower speed ratio to a higher speed ratio and downshifting from a higher speed ratio to a lower speed ratio, said transmission being adaptable for transmitting power to drive a vehicle from an engine having a throttle, a throttle actuator for opening and closing the throttle to control the engine, a controlling device having upshifting and downshifting tendencies for controlling the ratio changing means, said controlling device being operatively connected with a driving member of the vehicle and adapted for increasingly or decreasingly exerting upshifting tendencies in response to increases or decreases in vehicle speeds and also being operatively connected with the throttle actuator and adapted for increasingly or decreasingly exerting downshifting tendencies in response to various throttle actuator positions, said upshifting tendencies and downshifting tendencies reacting so as to control the ratio changing means whereby automatic upshifting and downshifting between the intermediate speed ratio and the high speed ratio is responsive to both vehicle speed and various throttle actuator positions, said controlling device including low speed ratio controlling elements adapted to control downshifting from the intermediate speed ratio to the low speed ratio whereby automatic downshifting to the low speed ratio is responsive to vehicle speed and only to a throttle actuator position that attains substantially full-open throttle, and to a throttle actuator position that attains substantially closed throttle.

40. In a control system for an automatic transmission having a plurality of speed ratios including a higher speed ratio and a lower speed ratio, and fluid pressure actuated ratio changing means for engaging the higher speed ratio or the lower speed ratio, said transmission being adapted for installation in a vehicle having an engine with a throttle, a throttle actuator for opening and closing the throttle to control the engine, a source of fluid pressure, fluid controlling mechanism for controlling the fluid pressure to the ratio changing means for automatic upshifting and downshifting and for engaging either the higher speed ratio or the lower speed ratio, inhibiting means for preventing automatic downshifting to the lower speed ratio thereby initially adapting the fluid controlling mechanism for engaging the higher speed ratio for starting the vehicle, interconnecting means operatively interconnecting the throttle actuator, the fluid controlling mechanism and the inhibiting means for controlling said inhibiting means whereby automatic downshifting to the lower speed ratio may be accomplished only in response to a throttle actuator position that attains substantially full-open throttle, a governing device adapted to impart upshifting tendencies to the fluid controlling mechanism responsive to vehicle speed, and opposing mechanism adapted to impart downshifting tendencies on the fluid controlling mechanism, said upshifting and downshifting tendencies reacting so as to provide for automatic upshifting and downshifting as a result of the combined influence of the tendencies, whereby in response to the said throttle actuator position the said automatic downshifting to the lower speed ratio will occur when the vehicle is not exceeding a certain speed and automatic upshifting from the lower speed ratio will occur when the vehicle attains a certain speed, a stop for limiting the movement of the throttle by the throttle actuator upon attainment of substantially full-open throttle, and an overtravel mechanism adapted for permitting additional movement for the throttle actuator beyond the position at which the throttle movement is limited by the stop thereby providing for a throttle actuator position located beyond a position that first attains substantially full-open throttle, at which the automatic downshifting to the lower speed ratio may occur.

References Cited in the file of this patent

UNITED STATES PATENTS

| Number | Name | Date |
|---|---|---|
| 1,818,910 | Sanine | Aug. 11, 1931 |
| 1,828,606 | Tanik | Oct. 20, 1931 |
| 1,886,003 | Garrison | Nov. 1, 1932 |
| 1,921,459 | Erban | Aug. 8, 1933 |
| 1,960,705 | Kochling | May 29, 1934 |
| 2,013,889 | Kohlbeck | Sept. 10, 1935 |
| 2,014,944 | Martyrer et al. | Sept. 17, 1935 |
| 2,051,553 | Fleischel | Aug. 18, 1936 |
| 2,120,104 | Livermore | June 7, 1938 |
| 2,120,896 | Koeppen et al. | June 14, 1938 |
| 2,162,937 | Carter et al. | June 20, 1939 |
| 2,260,406 | Roche | Oct. 28, 1941 |
| 2,322,479 | Schjolin | June 22, 1943 |
| 2,328,392 | Neracher | Aug. 31, 1943 |
| 2,351,483 | Carnagua | June 13, 1944 |
| 2,352,212 | Lang | June 27, 1944 |
| 2,375,440 | Roche | May 8, 1945 |
| 2,376,545 | Livermore | May 22, 1945 |
| 2,430,799 | Aspinwall | Nov. 11, 1947 |
| 2,453,156 | Neracher | Nov. 9, 1948 |
| 2,454,614 | Peterson et al. | Nov. 23, 1948 |
| 2,568,007 | Jandasek | Sept. 18, 1951 |
| 2,594,811 | Schjolin | Apr. 29, 1952 |
| 2,609,706 | Jandasek | Sept. 9, 1952 |
| 2,612,061 | Schjolin | Sept. 30, 1952 |
| 2,616,310 | Jandasek | Nov. 4, 1952 |
| 2,629,266 | Thurber | Feb. 24, 1953 |
| 2,645,137 | Roche | July 14, 1953 |

FOREIGN PATENTS

| 787,207 | France | July 1, 1935 |